Figure 1:
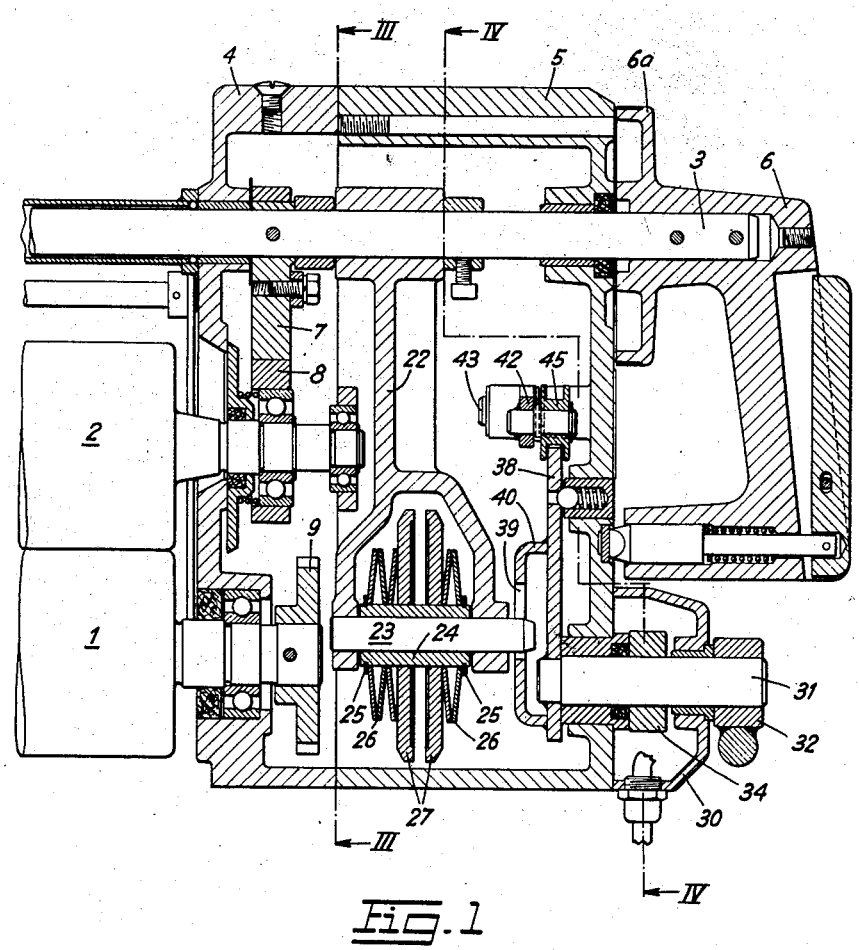

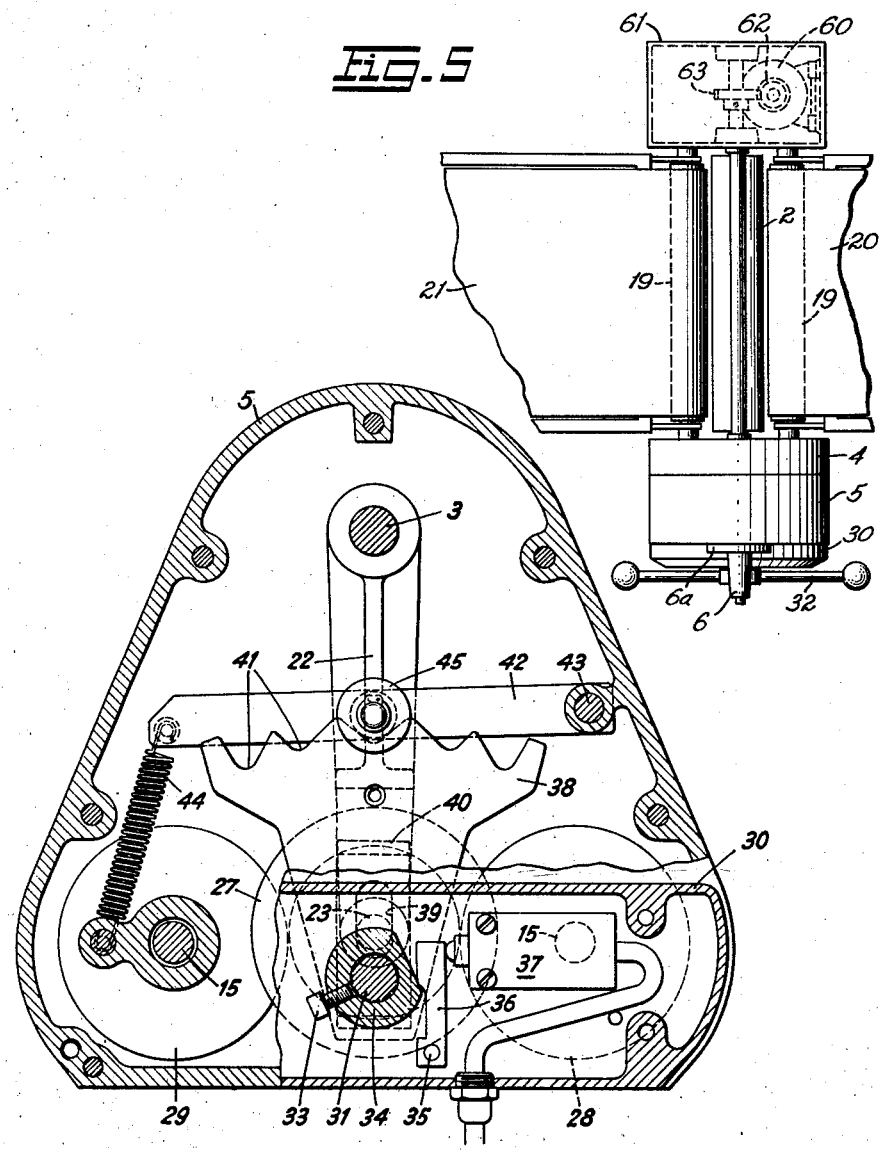

United States Patent Office 3,146,731
Patented Sept. 1, 1964

3,146,731
REVERSIBLE DOUGH SHEETER
Gustave August Seewer, Konstruktionswerkstatte Heimiswilstrasse 42, Burgdorf, Bern, Switzerland
Filed Apr. 26, 1961, Ser. No. 108,975
3 Claims. (Cl. 107—12)

My present invention relates to improvements in reversible dough sheeters in which on each side of a pair of rolls is disposed a conveyor that is so connected to a roll-reversing means that the run-off conveyor, i.e. the conveyor which carries off the rolled material, operates at a speed at least approximately equal to the peripheral speed of the rolls, and that the run-up conveyor, i.e. the conveyor feeding the material to be rolled, operates at a speed lower than said peripheral speed.

In a known machine of this kind a friction clutch is associated to each one-way clutch, which causes the run-up conveyor to operate at a speed lower than the peripheral speed of the rolls. The speed reduction depends on uncertain and fluctuating factors such as, for example, the frictional resistance arising in the conveyor means and the rolling resistance that in turn depends on the actual roll-off degree or rate.

It appeared that such a friction drive for the run-up conveyor suffices for machines of small output, but that for machines of large output a positive drive of the run-up conveyor is required, at any rate for the rolling-off operation. As, however, in such machines of large output the conveyor means and also the wire mesh guards on both sides of the two rolls practically always are of rather substantial length, much time would be lost when the dough piece would have to pass over certain run-up stretches at low speed.

Furthermore, practice has shown that when working up solid types of dough that are sticky only to a small degree, the run-up conveyor also during the rolling operation proper may be operated at a speed that is substantially equal to the peripheral speed of the rolls as long as the thickness of the running-up dough piece is less than about ⅜ of an inch.

It is very desirable, therefore, that when rolling out certain dough pieces the run-up conveyor may be run rapidly until the dough piece has reached the rolls, whereupon the conveyor speed may be reduced to the required extent and be re-adjusted, when required, during the rolling operation. It further is desirable to be in a position, when rolling out other dough pieces, to operate the run-up conveyor rapidly during the entire passage of the dough piece, and to be able, when required, to reduce the speed of the conveyor at any time.

Since the desiderata expressed above apply to either of the two conveyors, and since the run-off conveyor at the same time has to operate at a speed which at least approximately is equal to the peripheral speed of the rolls, the construction of the drive connection from the rolls to the two conveyors presents great difficulties. The primary aim of my present invention, therefore, is the provision of a robust and reliably operating reversible dough sheeter which satisfies the practical requirements set out above and of which the operation and attendance is simple.

In accordance with the invention, said aim shall be attained by driving the drive shaft of the run-off conveyor from the rolls via a one-way clutch and letting said shaft in turn drive the drive shaft of the run-up conveyor via a friction gearing in which a first friction disc is pinned to the drive shaft of each of the two conveyors and a pair of second friction discs are mounted loosely rotatable on an axle pin movable between these two drive shafts, the second friction discs by spring means being urged on to the side faces of the first friction discs.

Figure 2:
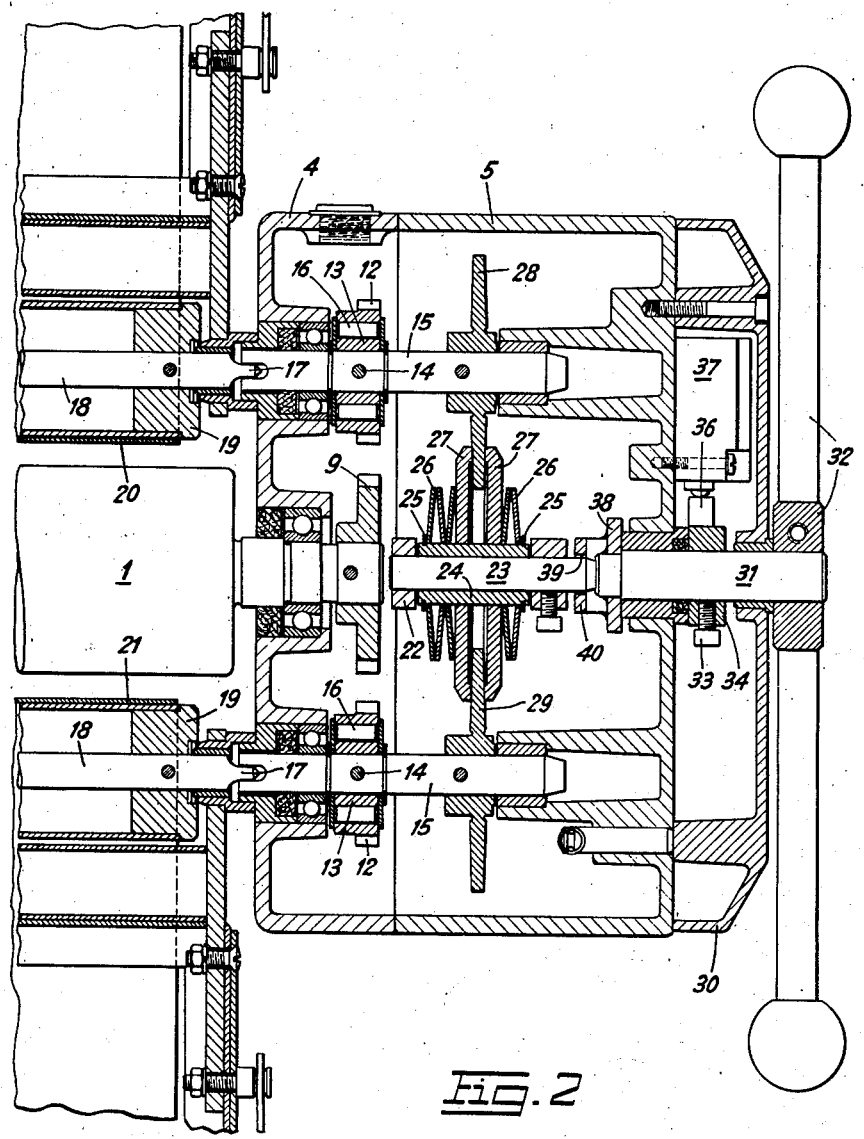
Figure 3:
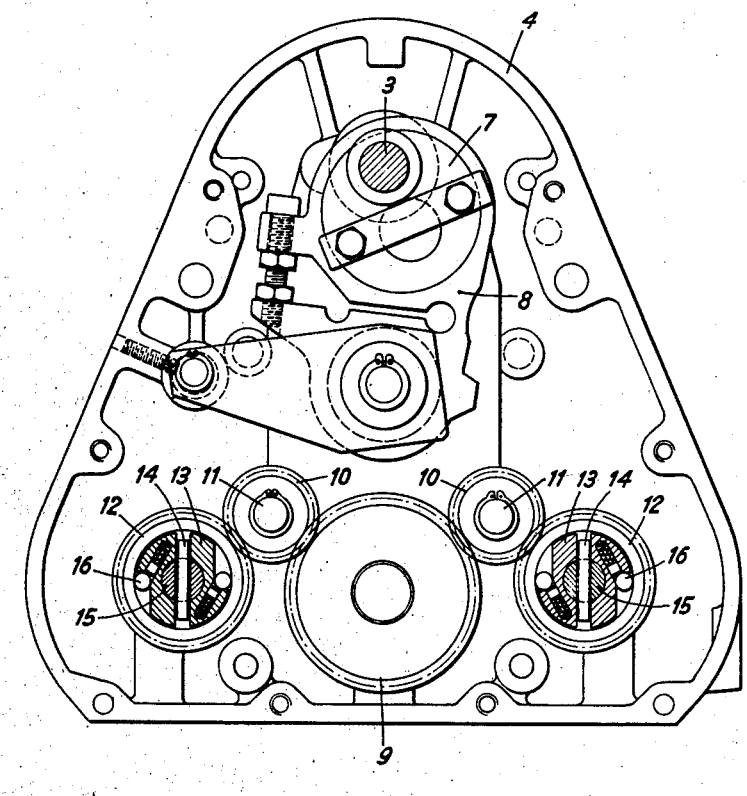

One form of the invention is shown by way of example in the accompanying drawing, in which FIG. 1 is a partial vertical section of the reversible dough sheeter in the axial plane of the roll pair,
FIG. 2 is an appurtenant partial horizontal section,
FIGS. 3 and 4 are vertical sections on the lines III—III and IV—IV respectively of FIG. 1, and
FIG. 5 is a reduced plan view of the dough rolling mill.

The bottom roll 1 is driven at one end by a motor 60 (FIG. 5) contained in a housing 61, helical gears 62 and 63 transmitting the drive from the motor 60 to the roll 1. Roll 1 at said end is operatively connected to the top roll 2 by a chain drive. Outside a housing that in the main comprises two parts 4 and 5, a handle 6 is pinned to a shaft 3 and carries a drum scale 6a which indicates the size of the rolling gap. To shaft 3, inside housing 4, 5 and inside a housing situated on the other side, are pinned eccentrics 7 of which each carries an eccentric member 8. In the latter are rotatably mounted the journals of top roll 2 which extend through vertical slots of the two housings. This arrangement corresponds substantially to the one shown and described, for example, in Swiss Patent No. 283,737, issued to G. A. Seewer on Nov. 1, 1952.

To the extension of the journal of bottom roll 1, which extends into housing 4, 5 is pinned a pinion 9 that via intermediate gears 10 which are pivoted on pins 11 to housing part 4, drives gears 12 which are rotatably mounted on clutch pieces 13. The latter by means of pins 14 are fixed to driving shafts 15 which in turn are rotatably mounted in the housing parts 4, 5. Each gear 12 forms the driving member of a one-way clutch of known construction that comprises clamping pins 16, clutch piece 13 forming the driven member. The appurtenant driving shaft 15 via a jaw clutch 17 drives a shaft 18 and a roller 19 fixed thereto. The latter in turn frictionally takes along the appurtenant endless conveyor belt 20 or 21, respectively, of a so-called conveyor table. The transmission ratio of the gear drive is selected so that the speed of the conveyor belt thus driven is approximately equal to the peripheral speed of the rolls 1 and 2.

Inside of housing 4, 5 a rocker 22 is pivotably mounted on shaft 3, which at its lower end carries an axle pin 23 on which a sleeve 24 is freely rotatable. The latter at its ends carries retaining rings 25 for spring discs 26. Sleeve 24 further carries two frictional discs 27 with opposite raised rims which through the spring discs 26 are urged against the opposing nearly plane-parallel but slightly conical or tapering side faces of two further frictional discs 28 and 29, respectively, which are fixed to the shafts 15. The frictional discs 27, 28 and 29 constitute a friction gear or torque converter of which the transmission ratio may be changed by moving axle pin 23 towards one or the other of the two driving shafts 15. When axle pin 23 is positioned halfway between the two shafts 15, the transmission ratio of the friction drive obviously is 1:1.

On the front or service side of the machine, in the front housing part 5 and in a cover 30 screw-fastened thereto, is rotatably mounted a control shaft 31 to the outwardly projecting end of which is fixed a control lever 32. By means of a screw 33, a cam ring is secured to control shaft 31. On being turned, cam ring 34 through a tracer 36 pivoted on a pin 35 actuates a reversing switch 37 of the electric roll-driving motor 60.

A notched segmental member 38 is fixed to that end of control shaft 31 which projects into housing 4, 5 and to the inside face thereof is fixed, as by welding, a strap 40 that is provided with a longitudinal slot 39. Member 38 on its periphery comprises an uneven number of notches 41 chosen in accordance with the working conditions. A lever 42 pivoted on a pin 43 within housing part 5 and subjected to the force of a tension spring 44, carries a roller 45 which in co-action with the notches 41 determines the position of member 38 and, thus, the position of slot 39 of strap 40. In slot 39 is engaged, without lateral play, an extension of axle pin 23 that is mounted in rocker arm 22.

The position of segmental member 38 thus positively determines the position of axle pin 23. When roller 45 sits in the central notch of member 38, axle pin 23 is situated halfway between the two driving shafts 15 and the transmission ratio of the friction drive is 1:1. By actuating the control lever 32, roller 45 may be engaged in another notch 41 to change the transmission ratio of the friction drive with the following results: Let it be assumed that control shaft 31 is angularly turned clockwise with reference to FIG. 4 so that roller 45 is engaged in the nearest notch 41. Reversing switch 37 then cuts in the drive motor so that bottom roll 1 is driven clockwise. On the run-off or delivery side, i.e. on the righthand side now, roller 19 through the gears 9, 10, 12 and the friction clutch secured to the appurtenant shaft 15 is driven at approximately the peripheral speed of the rolls 1, 2. By said angular turning of control shaft 31, axle pin 23 with the pair of friction discs 27 had been moved towards said driving shaft 15 by which is now is being driven. Said displacement of axle pin 23 thereby brings about a reduction of the speed, in accordance with its extent, of that driving shaft 15 which is situated on the in-take side, and thus a corresponding decrease in the feed or run-up speed of the material to be rolled.

By properly selecting the number and position of the notches 41, the most frequent and most favorable operational positions may be defined. In practice, the mode of operation is as follows.

The lump of dough to be rolled is fed to the machine in a thickness that at least corresponds to the maximum roll gap. On one hand, the lump of dough thus has a high stability of its own, and on the other hand there is not yet any large area of contact between the dough piece and the conveyor belt below same so that the belt cannot deform the dough piece when its speed does not correspond to that of the material to be rolled. The attendant thus has to move the control lever 32 from the neutral middle position by one notch of member 38 and to leave it in such new position until the rapidly moving run-up conveyor belt starts to upset the thinning dough band in front of the roll gap. At which gauge or thickness of the dough band such upsetting action will set in, depends on the nature of the material to be rolled. Up to this critical thickness, the attendant thus is able to operate very quickly, whereby the time of manipulation may be reduced to a minimum.

When the critical state mentioned is reached, the attendant now can prevent the upsetting of the dough band by further actuation of control lever 32. In further operation, the position of control lever 32 will determine the speed of the run-up belt for optimum adaptation to the relative roll-gap decrease; the smaller or closer the division of the notches 41 or, respectively, the greater the number thereof, the better the possibility of adaptation offered.

I claim:

1. In a reversing rolling machine for rolling-out dough and the like having a pair of rotatable superposed sheeting rolls at least one of which is adapted to be positively driven in opposite directions and a first and second conveyor device located on opposite sides of the bite of the rolls and alternately functioning as run-off and run-up conveyors depending upon the direction of rotation of the driven roll, in combination, a drive shaft operatively connected to each of the conveyors, one-way clutch means connecting the drive shafts to the driven roll operable to drive the run-off conveyor at a speed substantially equal to the peripheral speed of the sheeting rolls and inoperable to drive the run-up conveyor, and friction means connecting the drive shafts, whereby the run-up conveyor is driven by the drive shaft of the run-off conveyor, the friction means including a first friction disc fixed to each of the drive shafts, a pair of second friction discs, an axle pin on which the second friction discs are loosely mounted selectively movable between the drive shafts to vary the speed of the run-up conveyor, and resilient means urging the second friction discs against opposite sides of each of the first friction discs.

2. In a reversing rolling machine according to claim 1 wherein a control shaft is provided to which are fixed a manually actuable lever, a ring cam, a notched segmental member and a strap for moving the axle pin of the friction means toward one or the other of said drive shafts, said segmental member forming part of a notch-engaging device for latching said control shaft, said ring cam cooperating with a reversing switch for controlling a roll-driving motor, and the arrangement being such that when said control shaft and lever occupy an intermediate position said motor is cut out and the axle pin is situated halfway between said drive shafts.

3. A reversing rolling machine as set out in claim 2, in which the strap fixed to the control shaft has a radial slot through which projects the axle pin substantially without lateral play.

References Cited in the file of this patent

UNITED STATES PATENTS

| | | |
|---|---|---|
| 1,545,689 | Peters | July 14, 1925 |
| 2,275,714 | Anetsberger et al. | Mar. 10, 1942 |
| 2,792,792 | Seewer | May 21, 1957 |

FOREIGN PATENTS

| | | |
|---|---|---|
| 283,737 | Switzerland | Nov. 1, 1952 |